Figure 2:
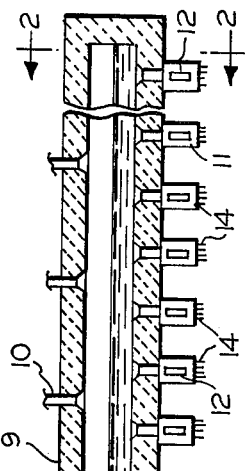

United States Patent [19]

MacPherson et al.

[11] 4,146,375

[45] Mar. 27, 1978

[54] METHOD FOR THE CONTINUOUS PRODUCTION OF GLASS FIBER STRAND

[75] Inventors: Charles R. MacPherson, Mt. Juliet, Tenn.; Robert E. Boyce, Wichita Falls, Tex.; Aaron G. Smith, Nashville, Tenn.

[73] Assignee: Reichhold Chemicals, Inc., White Plains, N.Y.

[21] Appl. No.: 900,727

[22] Filed: Apr. 27, 1978

Related U.S. Application Data

[63] Continuation of Ser. No. 624,990, Oct. 22, 1975, abandoned, which is a continuation of Ser. No. 440,608, Feb. 7, 1974, abandoned, which is a continuation of Ser. No. 290,633, Sep. 20, 1972, abandoned.

[51] Int. Cl.² .............................................. C03B 37/00
[52] U.S. Cl. ................................................ 65/2; 13/6; 65/11 W; 65/135; 65/136; 65/137; 65/346; 65/347; 65/DIG. 4
[58] Field of Search .................. 65/346, 1, 2, 11 R, 65/11 W, 135–137, 347, DIG. 4; 13/6

[56] References Cited

U.S. PATENT DOCUMENTS

| 2,465,283 | 3/1949 | Schlehr | 65/2 |
|---|---|---|---|
| 3,261,677 | 7/1966 | Plumat | 65/346 |
| 3,264,076 | 8/1966 | Veazie et al. | 65/2 |
| 3,321,290 | 5/1967 | Day et al. | 65/346 |
| 3,328,144 | 6/1967 | Glaser | 65/11 W |
| 3,332,758 | 7/1967 | Firnhaber | 65/14 |
| 3,358,066 | 12/1967 | Tiede et al. | 13/6 |
| 3,429,972 | 2/1969 | DeBussy | 13/6 |
| 3,573,016 | 3/1971 | Rees | 65/2 |

Primary Examiner—Robert L. Lindsay, Jr.
Attorney, Agent, or Firm—Brooks, Haidt, Haffner & Delahunty

[57] ABSTRACT

Method and apparatus for forming glass fiber strand directly and continuously from raw batch glass-forming material, which includes means for continuously electrically melting raw batch, glass-forming materials, forehearth and fiber forming means for continuously receiving said melted glass, means for continuously attenuating said glass from said fiber forming means in the form of a multiplicity of fiberglass filaments, and means for converging and winding said filaments in the form of a fiberglass strand.

6 Claims, 2 Drawing Figures

U.S. Patent    Mar. 27, 1979    4,146,375

METHOD FOR THE CONTINUOUS PRODUCTION OF GLASS FIBER STRAND

REFERENCE TO PRIOR APPLICATIONS

This application is a continuation of copending application Ser. No. 624,990, filed Oct. 22, 1975, which is a continuation of application Ser. No. 440,608, filed Feb. 7, 1974, which was a continuation of application Ser. No. 290,633, filed Sept. 20, 1972, all now abandoned.

BACKGROUND OF THE INVENTION

Several methods have previously been employed in the processing of glass for the purpose of forming attenuated filaments or fibers for use in reinforcing various thermosetting resins when they are formed into utilitarian objects.

One method involved the steps of melting glass batch in a comparatively large furnace, or glass tank, refining the glass in a refining chamber associated with said glass tank, then forming the glass into spherical bodies or marbles, which are subsequently cooled to room temperature.

These glass marbles were later delivered to a stream feeder, or bushing, which was electrically heated in order to remelt the glass marbles to a viscosity at which streams of glass could be flowed through orifices in the bushing, such flow attenuated into filaments, then converging and collecting same in the form of a strand, on a high speed, rotating mandrel.

The marble method was obviously costly in that it involved special apparatus for handling and feeding the glass marbles, and furthermore required relatively large amounts of electrical energy for remelting the marbles after they had been cooled to room temperature.

More recently, the so-called "direct melt" method has been evolved whereby the glass batch is reduced to a molten state and refined in a suitable glass furnace or glass tank, and the molten glass flowed directly from the glass tank through a forehearth channel, along the bottom of which is disposed a series of streamfeeders or bushings adapted to receive the molten glass directly from the forehearth, with attenuation of the glass into filaments, and collection into a strand, utilizing much the same methods as in the marble system.

The direct melt method was a substantial improvement, in that the marble forming and remelting step was elliminated at a great saving.

Nevertheless, the cost of initially melting the glass raw batch materials, and reducing them to the molten state was still extremely high because, in addition to the heat required to fuse the glass and maintain its molten state, tremendous heat input was also required just to maintain the temperature of the traditional, cathedral-like glass tank, with its massive refractory superstructure, and its cavernous ambient atmosphere above the relatively shallow glass pool. Inefficiancy was compounded by enormous heat losses up the flue as a consequence of the turbulence created by banks of high pressure fuel burners firing directly into the furnace atmosphere.

Exemplary of the size, mass and complexity of glass tanks utilized in conjunction with current direct melt processes, see FIG. 6 of U.S. Pat. No. 3,321,290, issued May 23, 1967, and those portions of the specification describing the furnace.

There has therefore been a long-felt need for some means of melting raw batch glass materials whereby such melting could be quickly and efficiently accomplished in a relatively small, confined fusion zone with the elimination of the inefficient, ponderous glass tanks heretofore utilized in the direct melt operation.

OBJECTS

It is therefore the principal object of this invention to provide composite apparatus for the direct production of reinforcing fiberglass strand from powdered raw batch material, said apparatus comprising, in operational sequence, a continuous source of supply of powdered raw batch glass material, electrical resistance pot means for continuously melting said raw glass material, refiner means for receiving said melted glass directly from said electrical glass melting means, a forehearth for receiving glass directly from said refiner and contiguous therewith, bushing means disposed along the underside of said forehearth, attenuating and collecting means for, respectively, attenuating said glass from said bushing means in the form of a multiplicity of glass filaments, and gathering and collecting same in the form of a reinforcing fiberglass strand.

Another object of this invention is to provide a method for manufacturing reinforcing fiberglass strand directly from raw batch, glass forming materials comprising the steps of:

(a) continuously electrically melting glass from powdered raw batch materials, (b) continuously flowing said glass into a refining zone, (c) continuously flowing said glass from said refining zone directly to a forehearth zone, (d) continuously flowing said glass from said forehearth zone into a multiplicity of filament drawing zones (bushings), (e) simultaneously continuously attenuating said glass from said bushing means into a multiplicity of solidified glass filaments, and (f) continuously gathering said attenuated filaments and collecting same in the form of a reinforcing fiberglass strand.

THE INVENTION

In essence, this invention involves the discovery that, contrary to all expectations, the electric melting of fiberglass raw batch materials, particularly the well known "E" glass, may be successfully utilized for direct processing into reinforcing strand.

It is true that electrical furnace means for the manufacture of various glass and ceramic materials have been known for many years.

See U.S. Pat. No. 3,429,972, issued Feb. 25, 1969, to de Bussy, and U.S. Pat. No. 2,817,695, to Hartwig issued Dec. 24, 1957, the former representing a vertical "pot" type furnace useful to the practice of this invention.

By the nature of electric melting however, these furnaces operate at extremely high temperatures, far in excess of temperatures normally employed to melt ordinary "E" glass. The de Bussy device, for example, functioning at temperatures in the vicinity of 3632° F. See de Bussy Column 1, Line 52.

Note Column 1, Line 46, of Hartwig wherein it is observed that his furnace operates at temperatures sufficient to melt kaolin, having a fusion point of 3245° F.

Under the earlier direct melt system whereby "E" glass was melted in a glass tank then fed directly to bushings, the glass tanks utilized were normally run at a maximum temperature of 2600° F., with a reduction in temperature of about 250° F., to the point of filamentation, or to about 2350° F. See U.S. Pat. No. 3,321,290, Column 16, lines 58 and 72.

It will therefore be readily apparent that the expectation would be that electric melting would be totally unsuitable for a direct melt program for the reason that, due to the relatively rapid, even violent, melting, and "short soak," the melted glass discharged from beneath an electric pot furnace would be quite gaseous, turbulent, relatively unrefined, and generally unsuitable for filamentation due to the presence of unreacted raw batch, bubbles, etc., all of which make continuous, efficient filamentation impossible.

As is known, the requirements for "E" glass to be filamented are such that it must be completely homogeneous, highly uniform and consistent both chemically and physically; in general, "E" glass is regarded as being considerably more "sophisticated" than the cruder forms of fibrous glass or ceramics such as are utilized for insulating purposes, to which electric melting might readily lend itself.

As will be apparent from the U.S. Pat. No. 2,817,695, electric melting of certain refractories for the production of rock wool has been utilized; but again, the uniformity and homogeneity of the final product are not nearly so critical as for "E" glass intended for filamentation for the reinforcement of thermosetting resins.

It has now been discovered that "E" glass can be successfully melted for direct filamentation, utilizing the electric furnace principal of U.S. Pat. No. 3,429,972, notwithstanding the fact that it rather violently, turbulently, and in an extremely localized zone, fuses glass at extreme temperatures approaching 4000° F., with practically no opportunity for refining or "soak," as compared to the rather leisurely melting and refining permitted by the long and spacious glass tanks used heretofore.

Figure 1:
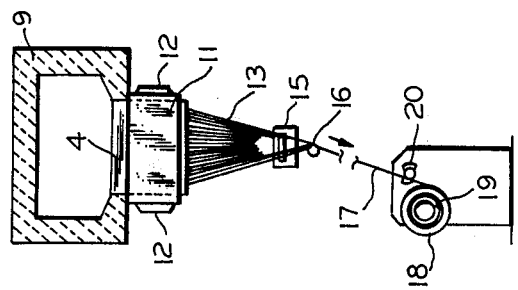
Figure 1:
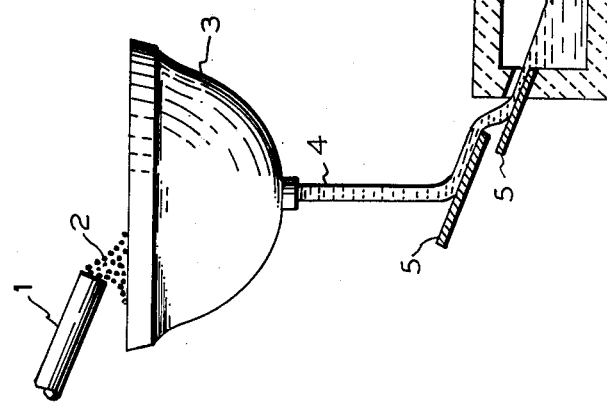

Referring now to the drawings,

FIG. 1 is a schematic diagram of the components of the composite apparatus of this invention, and FIG. 2 is a section through 2—2 of FIG. 1, but additionally depicting conventional apparatus for drawing filaments and converging them into a strand.

In carrying out the steps of the method of this invention, as will be seen from FIG. 1, the chute 1, connected to any conventional source of powdered raw batch glass material, continually supplies "E" glass, raw batch 2 to electrical resistance furnace 3. In the preferred embodiment of this invention, the pot furnace 3 is essentially that disclosed in U.S. Pat. No. 3,429,972.

If desired, by using any of several flexible duct devices, raw material chute 1 may be rotated about the inner periphery of resistance furnace 3 to thereby continuously and evenly distribute raw batch material around the inner periphery of furnace 3 according to a predetermined rate.

Alternatively, rotating skimmer means may be utilized for continuously maintaining the proper level of raw batch in the top portion of furnace 3, which raw batch serves also as heat insulation means for reducing heat loss from the melting furnace.

However, means for dispersing raw glass batch material to furnace 3 are essentially matters of choice, and, as such, form no critical part of this invention.

Raw batch materials are continuously melted in furnace 3 at a temperature of between about 3500° and 4000° F., and a resultant steady stream of molten glass 4 is continuously discharged from the bottom of furnace 3, said glass having a temperature of from about 2900° to 3100° F. at the point of discharge.

In the embodiment shown, molten glass 4 is continuously discharged upon sloping, heat resistant guide means 5, preferably of platinum, from which the glass flows, be gravity, directly into refiner means 6.

Refiner means 6 preferably is of rectangular construction, of suitable refractory material, and its temperature is maintained and stabilized at a temperature of from about 2300° to 2600° F. by conventional fuel burners 7 which may be positioned in either the crown, or along the sides as shown.

From refining means 6, the molten glass continuously passes beneath skimmer wall 8 into forehearth means 9 where, by conventional fuel burners 10 disposed either in the crown or sides, temperatures are maintained at the filamentation temperature of "E" glass, or about 2300° to about 2450° F.

Electrically heated bushing means 11, having electrical end terminals 12, continuously receive molten glass from the forehearth means.

Referring now to FIG. 2, there is illustrated the pool of glass 4 in forehearth 9, with bushing means 11 disposed therebeneath.

Filaments 13 are pulled from a multiplicity of orifices 14 in the bottom of bushing means 11, passed over roller size applicator means 15, gathered at point 16 into a strand 17, and collected on a collet 18 held in sleeve-like arrangement by high speed winding mandrel 19. The strand 17 uniformly traversed by traversing means 20 as it is wound.

Generally, the preferred embodiment of the foregoing method contemplates that the temperature of the glass in refiner means 6 will always be stabilized and maintained approximately 100° F. higher than the drawing temperature maintained in forehearth means 9.

Also, the optimum depth of glass in refiner means 6 will vary between 6" to 10", with the depth of the glass in the forehearth maintained at approximately 2⅜" to 3¼". Preferably therefore, the depth of the glass in the refiner means will be approximately twice that of the glass in the forehearth.

And, as is well known, by slight adjustments in temperature at various stages of the process, and/or adjustment of the gap between the bottom of skimmer wall 8 and the refiner-forehearth floor, the relative levels of glass in the refiner and forehearth may be maintained as desired.

What is claimed is:

1. In a direct-melt process for producing continuous glass fiber filaments from continuously fed raw batch glass-forming material in which said batch material is melted by electric current flowing directly through the melting batch material in a vertical pot-type electrical resistance furnace having a bottom discharge and, ultimately, the molten glass is drawn in the form of continuous filaments from one or more streamfeeders or bushings, the improvement comprising continuously feeding and melting substantially powdered raw batch glass-forming material having composition to produce textile-grade glass filaments, continuously discharging a stream of the molten glass at a temperature above 2900° F. from said bottom discharge of said furnace and permitting said stream to flow by gravity a distance downwardly to cool the same and then into one end of a horizontal refiner which is separate from said furnace, continuously flowing the glass horizontally through said refiner while applying heat and maintaining a shallow depth of the glass therein to stabilize the temperature of the glass, continuously flowing the glass horizontally from said refiner immediately into a horizontal forehearth which mounts said one or more bushings, and continuously flowing the glass horizontally within said forehearth to said bushings while applying heat and maintaining a shallow depth of the glass therein, the glass within said refiner being maintained at a depth of from about 6" to about 10", and the glass within said forehearth being maintained at a depth of from about 2¾" to about 3¼".

2. A process according to claim 1, in which said raw batch glass-forming material has a composition to produce substantially "E"-glass, the molten "E"-glass has a temperature of from about 2900° F. to about 3100° F. upon discharge from said furnace, the glass within said refiner is maintained and stabilized at a temperature of from about 2300° F. to about 2600° F., and the glass within said forehearth is maintained at a temperature of from about 2300° F. to about 2450° F.

3. A process according to claim 2, wherein the glass within said refiner is maintained at a temperature substantially 100° F. higher than the temperature at which the glass is drawn from said one or more bushings.

4. A process according to claim 1, wherein the molten glass stream discharged from said furnace is ambiently cooled prior to entering said refiner so that the glass within the refiner can be maintained and stabilized at a temperature of from about 2300° F. to about 2600° F.

5. A process according to claim 4, wherein said molten glass stream discharged from said furnace is cooled in ambient air prior to entering said refiner.

6. A process according to claim 1, wherein the glass within said refiner is maintained at a depth which is about twice the depth of the glass within said forehearth.

* * * * *

UNITED STATES PATENT AND TRADEMARK OFFICE
CERTIFICATE OF CORRECTION

PATENT NO. : 4,146,375
DATED : March 27, 1979
INVENTOR(S) : MacPherson et al.

It is certified that error appears in the above—identified patent and that said Letters Patent are hereby corrected as shown below:

The date of issuance of the patent should read -- Mar. 27, 1979 --.

Column 1, line 57, correct spelling of "Inefficiency".

Signed and Sealed this

Twelfth Day of June 1979

[SEAL]

Attest:

RUTH C. MASON
Attesting Officer

DONALD W. BANNER
Commissioner of Patents and Trademarks